United States Patent
Harney

(12) 
(10) Patent No.: US 6,825,744 B2
(45) Date of Patent: Nov. 30, 2004

(54) ACTIVE ALIGNMENT AS AN INTEGRAL PART OF OPTICAL PACKAGE DESIGN

(75) Inventor: Kieran Patrick Harney, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/134,889

(22) Filed: Apr. 29, 2002

(65) Prior Publication Data

US 2003/0201856 A1 Oct. 30, 2003

(51) Int. Cl.$^7$ ............................................... H01H 51/22
(52) U.S. Cl. ........................................ 335/78; 361/760
(58) Field of Search ................................. 361/720, 724, 361/736, 748, 760, 710, 761; 257/712–713, 784–787, 781, 712.3, 780; 335/78

(56) References Cited

U.S. PATENT DOCUMENTS 6,076,737 A * 6/2000 Gogami et al. ............. 235/492
6,548,895 B1 * 4/2003 Benavides et al. .......... 257/712

* cited by examiner

*Primary Examiner*—Lincoln Donovan
(74) *Attorney, Agent, or Firm*—Bromberg & Sunstein LLP

(57) ABSTRACT

A microstructure package and a method of assembling such a package are described. A package base provides an outer body of the package and has an internal cavity. A device die is located within the cavity, and a flexible die paddle connects the base and the die. The paddle is immovably fixed to hold the die in a highly precise position relative to the base.

12 Claims, 5 Drawing Sheets

ACTIVE ALIGNMENT AS AN INTEGRAL PART OF OPTICAL PACKAGE DESIGN

FIELD OF THE INVENTION

The invention relates to assembly of small electromechanical packages. More particularly, it relates to the precision alignment of optical structures to optical fibers or alignment features within optoelectronic or semiconductor packages.

BACKGROUND ART

Micro-electromechanical systems (hereinafter "MEMS") integrate micro-mechanical structures with micro-electronic circuits to produce an integrated device. Because of their small size, MEMS have many useful applications. For example, MEMS have been implemented as mirrors within optical devices to redirect light beams, as accelerometers used to deploy air bags in automobiles, as well as for micro-machined gyroscopes, motors, and pumps.

One of the biggest challenges in optical MEMS packaging is high precision alignment. Typically, MEMS devices require that a micro-mechanical die have a highly precise position with respect to various associated input and output elements. "Highly precise position" as the term is used herein, refers to a position accurate to within less than one micron. For example, alignment of MEMS elements to optical fibers or light beams from other sources is required to be typically accurate within a fraction of one micron. There are various techniques to actively align optical fibers in use in the industry and described in academic literature.

Related to MEMS devices are optoelectronic packages, which contain one or more passive and/or active optical elements in a structure produced using techniques similar to conventional semiconductor fabrication processes. The term "microstructure" is used herein to generically refer to MEMS and/or optoelectronic devices.

A microstructure device can be attached in a package or holder using various techniques including conventional silicon die attachment processes. Typical semiconductor packaging tolerances for die attachment are on the order of tens of microns, with some technologies capable of approximately 5 microns. Achieving sub-micron positional accuracies is non-trivial.

Current approaches perform a passive positional alignment of the microstructure device during the die attachment process. Subsequently, the optical fiber or light source is actively aligned to the microstructure element. Such approaches are typically very slow and relatively expensive.

SUMMARY OF THE INVENTION

A microstructure package and a method of assembling such a package are described. A package base provides an outer body of the package and has an internal cavity. A device die is located within the cavity, mounted to a flexible die attach paddle, and the flexible die attach paddle connects the base and the die. The paddle is then immovably fixed to hold the die in a highly precise position relative to the base.

An adhesive material may be used to immovably fix the paddle, which may be made, for example, of a Kovar-type metal alloy, copper, copper alloy, Alloy 42, Invar, stainless steel, or nickel alloy. The adhesive material may include, without limitation, solder, glass, or epoxy. The die may be further wirebonded to the base to provide electrical connection. In various specific embodiments, the die may be either an active or passive optical device.

The package may further include a package cover having an optical window, wherein the paddle is immovably fixed such that the die has a highly precise position relative to the optical window or to some other relative reference position. If the package has one or more optical fibers attached, then the paddle is immovably fixed such that the die has a highly precise position relative to the fiber or fibers.

In specific embodiments, the die may be a two- or three-dimensional MEMS array. A two dimensional array refers to an out of plane MEMS structure where the MEMS mirrors have two states (binary) either in the plane of the die surface or out of the die surface plane. There can be 1×1 to N×N mirrors in this structure. A three dimensional array refers to an in-plane MEMS structure that can be moved to different positions by rotation in the plane of the die surface. The package may be a conventional semiconductor package, a butterfly-type package, some other standard or variant of an optical or optoelectronic package, or a custom package.

BRIEF DESCRIPTION OF THE DRAWINGS

Embodiments of the present invention will be more readily understood by reference to the following detailed description taken with the accompanying drawings, in which.

DETAILED DESCRIPTION OF SPECIFIC EMBODIMENTS

Embodiments of the present invention use a floating die attach paddle that can be actively aligned to an external light source after die attachment is complete. Then, the floating paddle position is fixed and package assembly is completed. This approach allows the use of conventional semiconductor processes and permits postponing alignment of the microstructure device until the final stage of package assembly, yet this process is still compatible with a hermetic package. This concept can be applied to many different package designs and the package need not necessarily be hermetic.

Figure 1A:
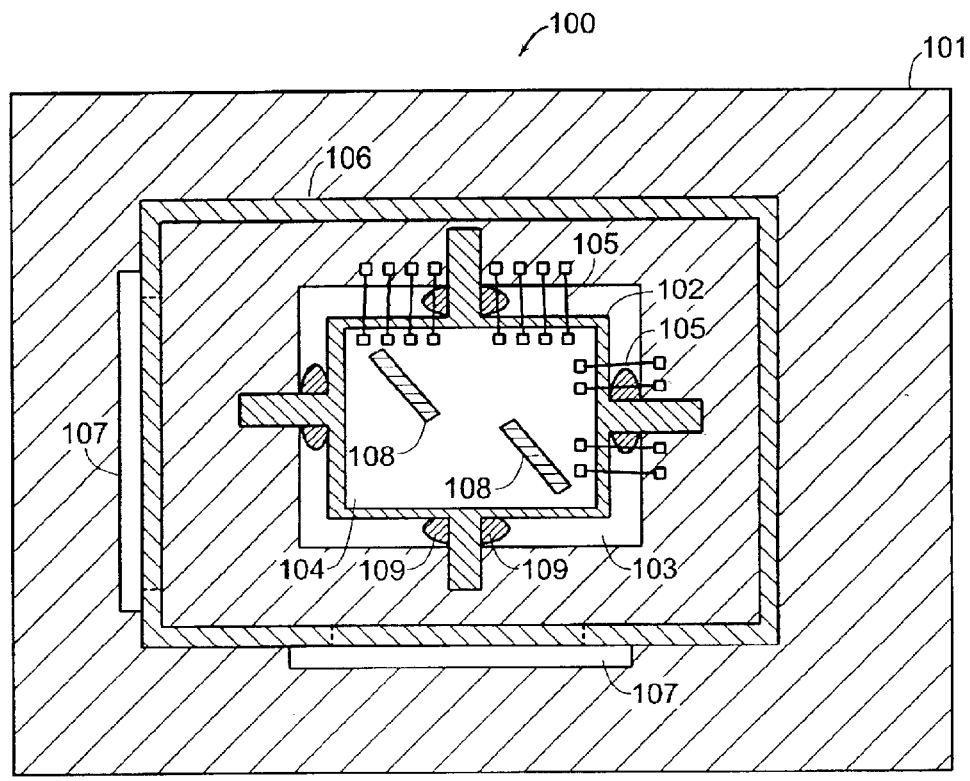
FIG. 1 shows a two-dimensional MEMS array according to an embodiment of the present invention.
Figure 1B:
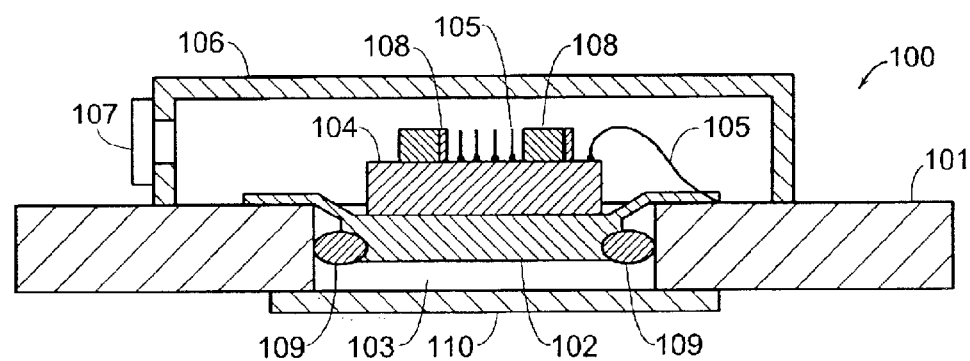

FIG. 1 shows a two-dimensional MEMS array package 100 according to one embodiment of the present invention. A ceramic substrate is used as the package base 101. A flexible floating paddle 102 is attached to the base 101 in a cavity 103 that penetrates the base. The floating paddle 102 may be made of various materials, including without limitation a Kovar-type metal alloy, copper, copper alloy, Alloy 42, Invar, stainless steel, or nickel alloy. A two-dimensional MEMS die 104 having optical mirrors 108 is die attached to the floating paddle 102 using a stable adhesive such as, for example, solder, glass, or epoxy. The die 104 may further be attached across the cavity 103 by wirebonds 105 connected to the substrate of the base 101 to provide electrical connection. A metal lid 106 is then soldered over the die 104. The lid 106 has pre-attached hermetic windows 107 at two sides, which may have lenses pre-molded into them.

Figure 2:
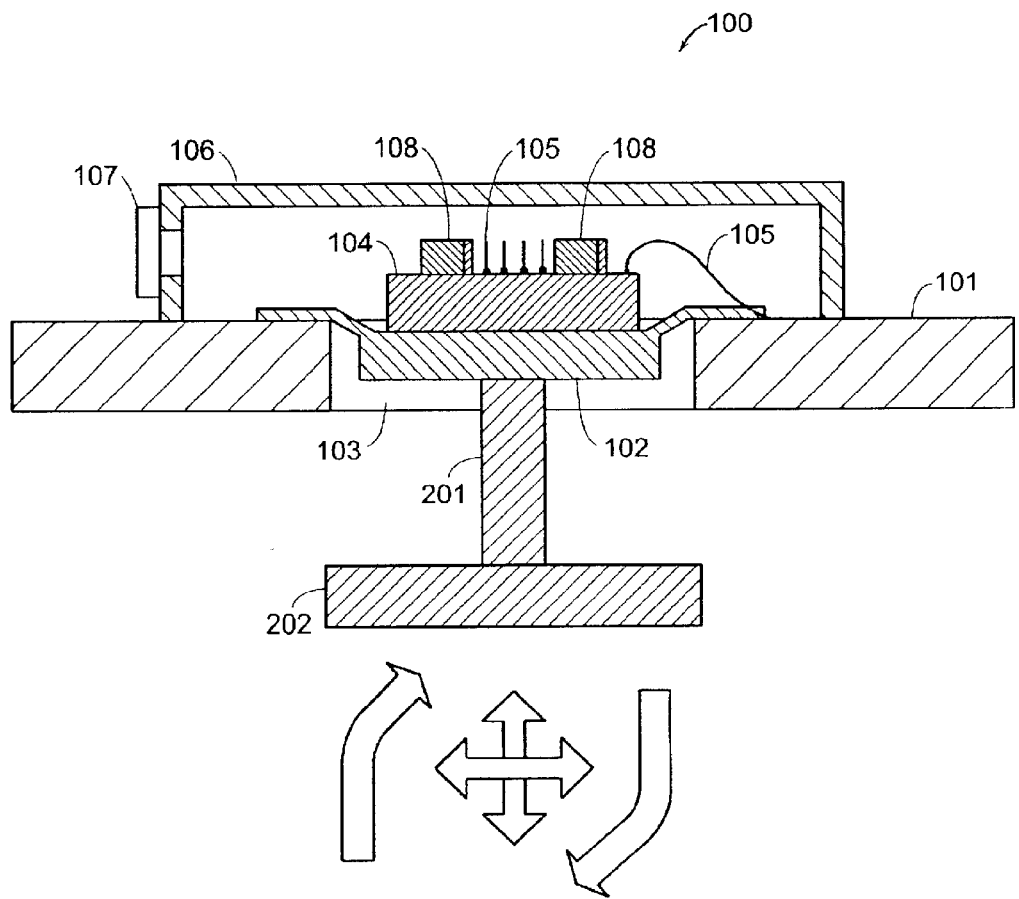
FIG. 2 shows alignment of the MEMS die within device of FIG. 1.

FIG. 2 shows the MEMS package of FIG. 1 as its base 101 is placed on an active alignment bench for the final stage of package assembly. The paddle 102 is gripped from below by a vacuum head 201 of a high-precision multi-axis actuator 202. Output fibers are aligned a priori at the optimal position vis-a-vis the product requirement, and light is projected into the package 100 by input fibers, which are also precision aligned. The input light is directed at the mirrors 108 on the MEMS element die 104 in the package 100, then while the package 100 is powered, the flexible paddle 102 can be actively adjusted by the actuator 202 to optimize the position of the die 104 in the package. Once the optimum position is found, the paddle 102 is fixed into position by a stable adhesive 109. The bottom opening of the cavity 103 is then sealed hermetically with a metal lid 110.

For this active alignment process, the fibers or optical signal can be presented to the package 100 in many different ways. They can be pre-fixed and pre-aligned such that the adjustment of the die paddle 102 gives optimal optical path performance. The fibers can be aligned as part of flexible paddle alignment step, or they can be aligned after the die attach paddle has been aligned and fixed. Other alignment procedures are possible, including a passive alignment where the position of the flexible die paddle is optimized without actively using an optical source.

Various embodiments also include arrangements where the supplied lid 106 and windows 107 may have pre-attached optical fibers that are aligned relative to each other using clipping, fusing or some other technique. The final active alignment of the die paddle 102 would then be the last alignment step for the product. Embodiments also can be executed using a variety of different materials and techniques for die attachment, wirebonding, top and bottom lid seals, and paddle fixing. The top and bottom lids, 106 and 109 respectively, can be manufactured in a number of different and ways from a variety of different materials to achieve hermetic or non-hermetic sealing. Compliance of the paddle 102 will be dependant on the design of its connecting tie bars and how they are fixed to the base 101 or package. Tie bar designs can vary and the number of tie bars can be changed to allow for the required compliance and required number of degrees of freedom.

Figure 3A:
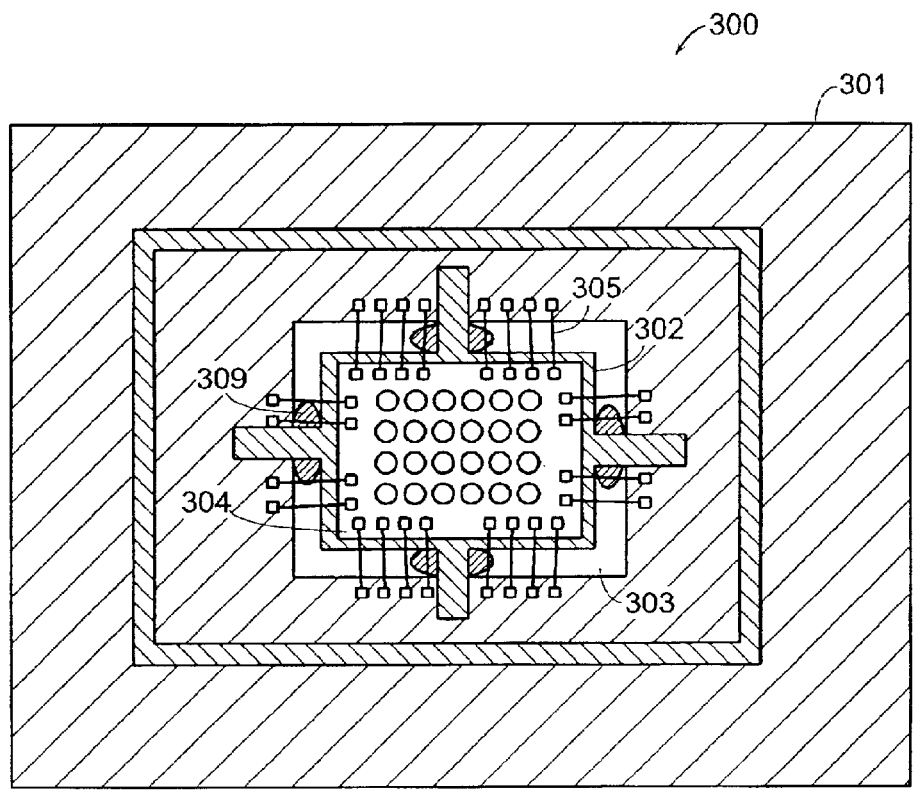
FIG. 3 shows a three-dimensional MEMS array according to an embodiment of the present invention.
Figure 3B:
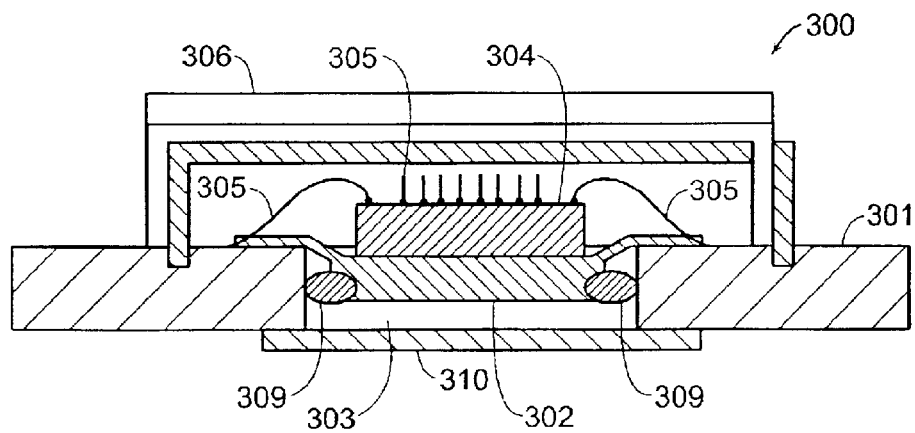

Thus, various embodiments of the invention can be applied to many different types of product design and MEMS concepts. For example, FIG. 3 shows a three-dimensional MEMS array package with an arrangement of a cavity 303, paddle 302, and die 304 similar to the one described with respect to the two-dimensional MEMS array package shown in FIGS. 1 and 2. In this case light is incident on the package through the top of the package, which would typically be a lid transparent to the wavelength of light used in the application. The fibers may be attached to the package or they may be aligned by the end user as part of the next level assembly. In this case alignment of the MEMS array to a package alignment feature suitable for use in the next level assembly may be required.

Figure 4A:
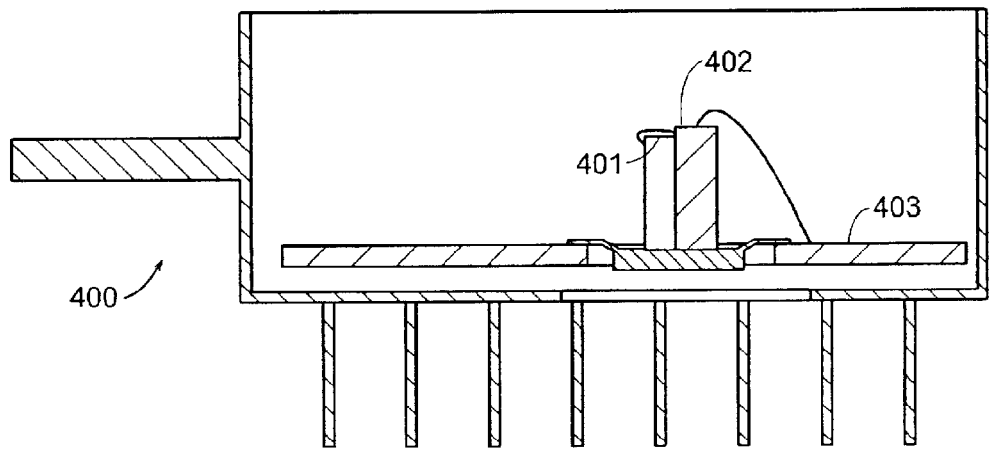
FIG. 4 shows a butterfly package embodiment of the present invention.
Figure 4B:
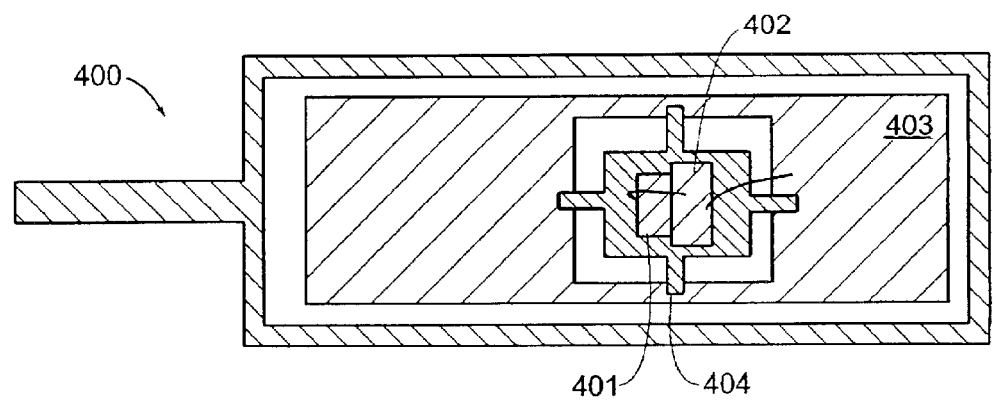

FIG. 4 shows an embodiment based on alignment of a MEMS device in a butterfly package 400 as is commonly used in optical communications applications. A MEMS die 401 is die attached to a ceramic submount 402, which is in turn die attached to a ceramic bench 403 by a die paddle 404. The bench 403 is subsequently mounted in the butterfly package 400. The die alignment can then be actively done through the bottom of the package 400, and the paddle 404 fixed in position after alignment. The die active alignment could be done before or after the ceramic bench 403 is placed in the package 400, and the material sets can be varied. The active alignment through the bottom of the package 400 can done either before or after sealing the top lid. This alignment of the paddle 404 can equally be done from the top-side of the package 400 using an appropriate alignment tool and system. In this case there is no necessity for a hole in the bottom side of the package 400 and sealing is done from the top-side. This technique could be used to align a laser diode to an output fiber. It could similarly be used in optoelectronic devices for alignment to a photo-detector, optical amplifier, Vertical-Cavity Surface-Emitting Laser (VCSEL) or other optical component.

In some embodiments, thermal conduction may be desirable between the die 401 and the bottom side of the package 400. In such case, thermally conductive materials can be placed or dispensed between the bottom of the paddle 404 and the bottom lid. The paddle 404 and its tie bar structure can also be optimized for thermal considerations.

Figure 5:
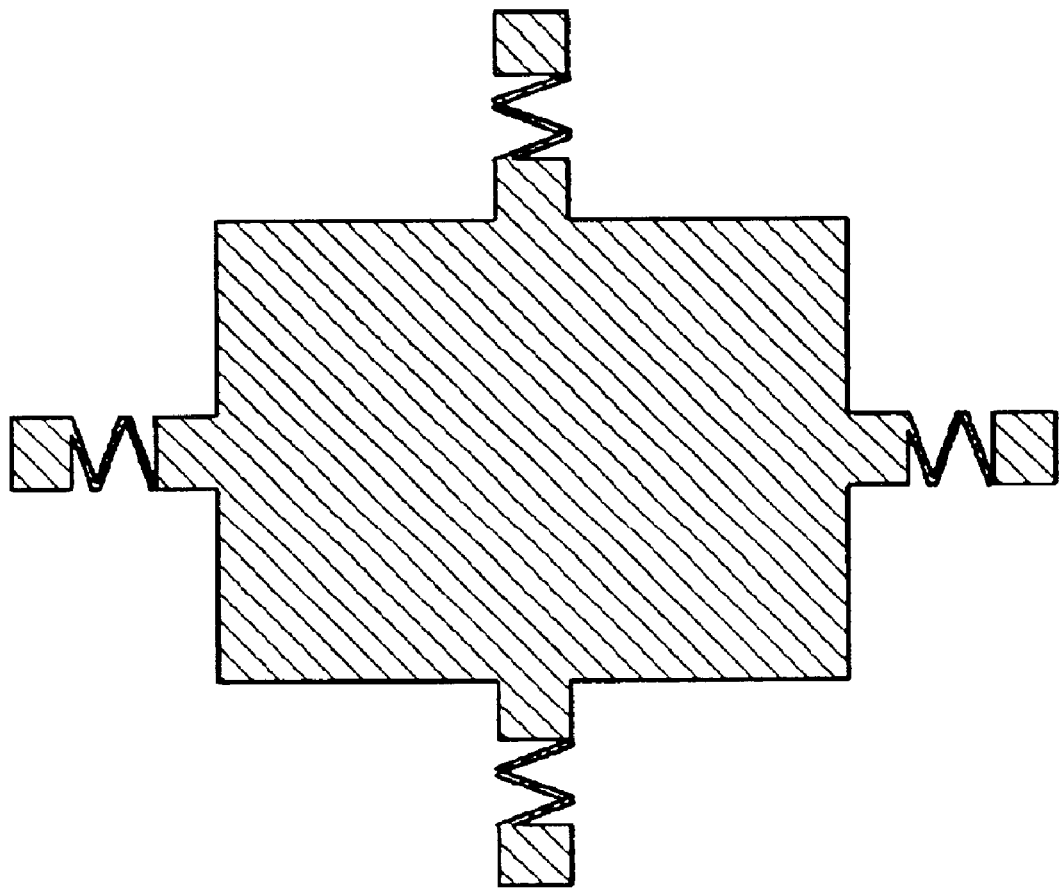
FIG. 5 shows one version of a flexible die paddle in greater detail.

FIG. 5 shows one version of a flexible die paddle in greater detail. In FIG. 5, a planar spring structure provides the necessary flexibility. In other embodiments, different specific structures may provide such flexibility, including without limitation, a non-planar spring structure, a ball-and-socket structure, etc.

Although various exemplary embodiments of the invention have been disclosed, it should be apparent to those skilled in the art that various changes and modifications can be made which will achieve some of the advantages of the invention without departing from the true scope of the invention.

What is claimed is:

1. A microstructure package comprising:
   a package base providing an outer body of the package and having an internal cavity;
   a device die located within the cavity;
   a flexible die paddle attached to the die, including a coupling structure connected to the outer body of the package base, wherein the coupling structure adapted for displacement to adjust the position of the die so as to establish a highly precise position of the die relative to the base; and
   an adhesive material that immovably fixes the die in the highly precise position.

2. A microstructure package according to claim 1, wherein the paddle is made of a Kovar-type metal alloy.

3. A microstructure package according to claim 1, wherein the die is further wirebonded to the base.

4. A microstructure package according to claim 1, wherein the die includes an active optical device.

5. A microstructure package according to claim 1, wherein the die includes a passive optical device.

6. A microstructure package according to claim 1, further comprising:
   a package cover having an optical window;
   wherein the coupling structure is displaced such that the die has a highly precise position relative to the optical window.

7. A microstructure package according to claim 6, wherein the package cover has at least one optical fiber attached and the coupling structure is displaced such that the die has a highly precise position relative to the fiber.

8. A microstructure package according to claim 1, wherein the die is a two-dimensional MEMS array.

9. A microstructure package according to claim 1, wherein the die is a three-dimensional MEMS array.

10. A microstructure package according to claim 1, wherein the package is a butterfly-type package.

11. A microstructure package according to claim 1, wherein the highly precise position of the die is established by an active alignment procedure.

12. A microstructure package according to claim 1, wherein the highly precise position of the die is established by a passive alignment procedure.

* * * * *